April 30, 1968 J. KNOLL ETAL 3,381,278

DATA HOLDING SYSTEM

Original Filed April 11, 1963 2 Sheets-Sheet 1

INVENTORS
Jack Knoll
Kuei-Yin Hsu
BY Curtis, Morris & Safford
ATTORNEYS

DATA HOLDING SYSTEM

Original Filed April 11, 1963 2 Sheets-Sheet 2

INVENTORS
Jack Knoll
Kuei-Yin Hsu
BY Curtis, Morris & Safford
ATTORNEYS

United States Patent Office 3,381,278
Patented Apr. 30, 1968

3,381,278
DATA HOLDING SYSTEM
Jack Knoll, Plainview, N.Y., and Kuei-yin Hsu, Stamford, Conn., assignors to Teleregister Corporation, Stamford, Conn.
Continuation of application Ser. No. 272,437, Apr. 11, 1963. This application Dec. 22, 1966, Ser. No. 604,066
10 Claims. (Cl. 340—172.5)

ABSTRACT OF THE DISCLOSURE

A query and reply system which includes a plurality of remote input-output devices, each of which is capable of generating a query for a central station. The central station includes an input multiplexer and a query storage device which combine to accept queries from the remote devices as they are generated on an essentially simultaneous basis and assemble query messages which are then applied to a processing element. Replies from the processing element are stored in a reply storage element and transmitted back to the remote devices through an output multiplexing device on an essentially simultaneous basis. The improvements of this invention relate primarily to the manner in which the query assembly function and the reply sending function are controlled.

This application is a continuation of application Ser. No. 272,437, Apr. 11, 1963.

This invention relates to high-speed data handling systems. More in particular, this invention relates to improved apparatus for processing "query" signals, e.g. in the form of telephone dial pulses. For detailed information regarding an earlier system of this general class, reference may be made to copending application Ser. No. 798,005, filed on Mar. 9, 1959 by E. A. Avakian et al., now Patent 3,133,268.

As an illustrative embodiment of the present invention, there is described hereinbelow a stock quotation system wherein requests for stock data, such as the current price, are initiated at any one of a large number of stations comprising dial telephone instruments. These instruments are connected to central processing apparatus which is responsive to the dial pulses and arranged to develop and send back to each requesting instrument an answer in the form of a spoken message. The system described herein is operable with up to 1024 telephone instruments, and is arranged to develop audible answer-back signals for all query signals almost immediately upon receipt of a complete query.

Accordingly, it is an object of this invention to provide improved signal handling apparatus. Another object of this invention is to provide a high-speed "query and reply" system such as might be used for furnishing brokers with stock quotations and the like. Other objects, aspects and advantages of this invention will in part be pointed out in, and in part apparent from, the following description considered together with the accompanying drawings, in which.

Figure 1:
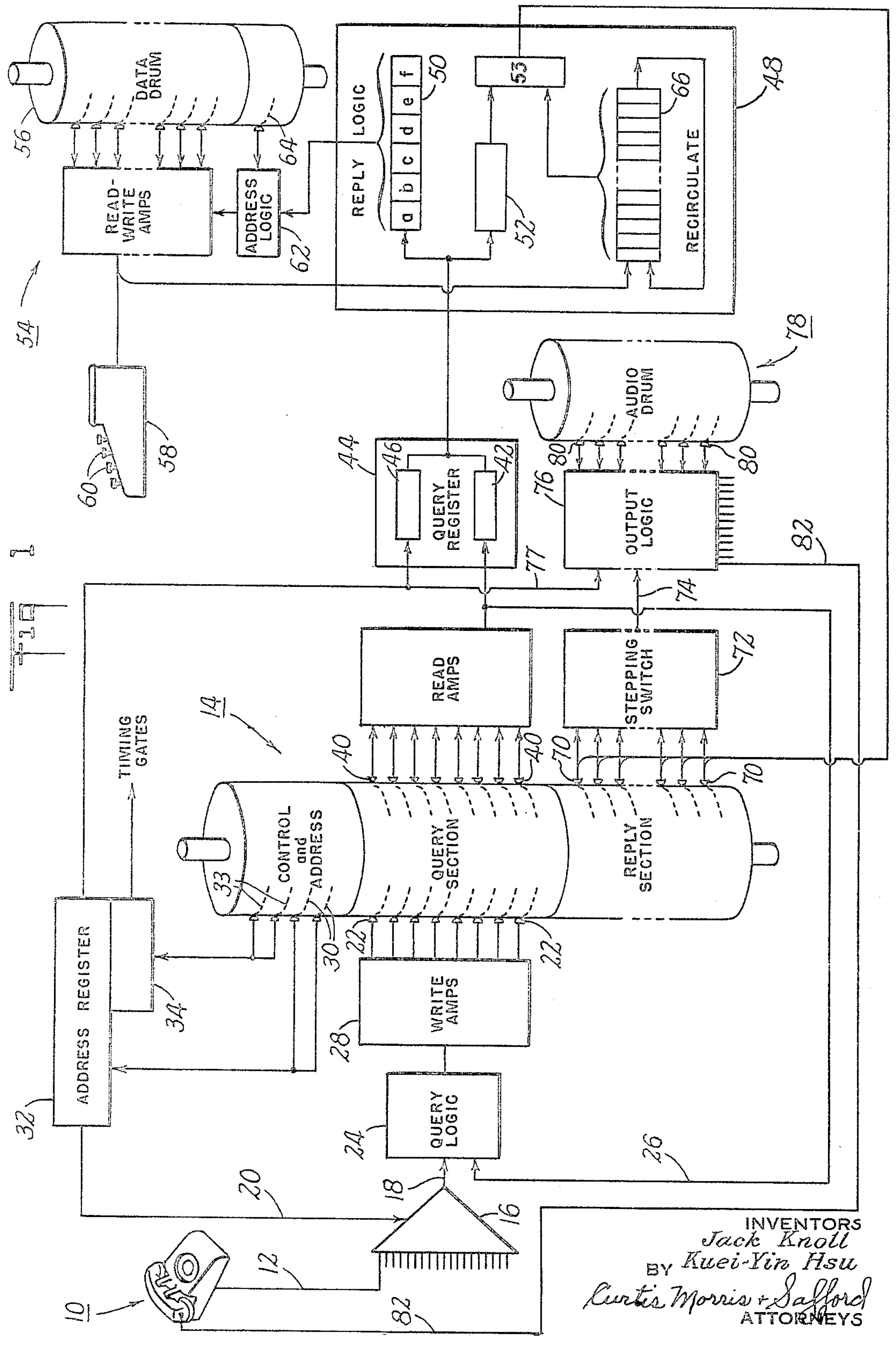
FIGURE 1 is a block diagram showing in outline form the principal interconnections of the major components of the system.

Referring now to FIGURE 1, there is shown a stock quotation system comprising a group of dial telephones 10, up to 1024 in number, each of which is connected to a corresponding outgoing line 12. The telephones 10 typically will be located in stock brokerage offices, and serve to provide the broker with up-to-date stock prices as an aid to completing stock transactions. The system disclosed herein is capable of providing, almost instantaneously, data concerning any of several thousand stocks. To obtain this data, the broker simply lifts the telephone handset from its cradle and dials a four digit code number identifying the stock in question. Thereafter, the broker will hear over the telephone earpiece a spoken message, of up to 66 words in length, giving detailed data on the requested stock, such as the latest price, the opening price, the number of shares sold, etc.

Each of the lines 12 is "open" while the corresponding telephone handset is in its cradle. When the handset is lifted out of its cradle, the line is "closed" to complete a conductive circuit to a common ground return path (not shown). While the dial mechanism is being "wound up," the line remains closed, and when the dial is released, the line is periodically opened a number of times corresponding to the number dialed so as to produce the usual train of dial pulses. Upon completion of dialing, the line remains closed unitl the telephone handset is returned to its cradle.

The dial signal from a telephone starts with the handset being lifted from its cradle, which closes the corresponding line 12. When the dial mechanism is wound up and released, the line is periodically opened and closed a number of times corresponding to the number dialed. Between digits there is a long pause while the dial is wound up. For example, if a subscriber dials 3721, the signal received starts with a long close, followed by three short interruptions, a long close, seven short interruptions, long close, two short interruptions, long close, one short interruption, and then a continual long close until the subscriber hangs up.

The lines 12 are connected to an input multiplexing arrangement which detects the dial pulses and assembles the four-digit query signals on a rotating magnetic drum 14. Each one of the lines 12 is assigned a corresponding area or segment of the drum 14 in which the query signal transmitted over that line is assembled. Detection of the dial pulses is accomplished by a scanning apparatus comprising a high-speed relay switching circuit 16 (e.g. incorporating conventional transistor logic) adapted to connect the lines 12 sequentially to a single input line 18. Switching circuit 16 is controlled by address signals from address line 20 in such a way that the particular line 12 being sampled at any instant corresponds to the segment of the magnetic drum 14 then under the magnetic drum write heads 22.

The total time interval of a momentary open-and-close during dialing is approximately 100 milliseconds, nominally divided 50–50, i.e. 50 milliseconds for the "open" and 50 milliseconds for the "close." However, the 100 milliseconds time interval can, under certain circumstances, be divided 70–30 or 30–70. In order to detect all possible changes of state of the lines 12, a sampling rate of at least 1 sample per 30 milliseconds is required. In the present embodiment, the lines 12 are actually sampled once every 16.5 milliseconds, by using a drum 14 which makes a complete revolution every 33 milliseconds and sampling the lines 12 twice every revolution of the drum.

The pulse samples on input line 18 are directed to control circuitry generally designated as "Query Logic" and identified in FIGURE 1 by a block 24. This Query Logic also receives, over a feedback line 26, signals representing data already stored on drum 14, i.e. signals indicating the previous history of lines 12. The Query Logic 24 compares the present state of each line 12 with its previous history, as will be explained in more detail hereinafter, and appropriately updates the data stored on the drum.

Specifically, the Query Logic determines whether a change of state of any of the lines 12 is: (1) a pulse which already had been sampled, (2) a new pulse forming part of a partially dialed digit, or (3) the first pulse of a train of pulses representing a new digit. Upon such determination, the Query Logic suitably activates the query write circuits 28 so that the write heads 22 record any required new data in the proper locations on the drum 14.

The query signals are assembled in eight tracks of the drum 14, the portion of the drum containing these tracks being referred to herein as the query section. The drum 14 also includes a control and address section, and a reply section into which the answer (i.e. the requested stock data) is loaded for transmittal back to the requesting subscriber.

Figure 2:
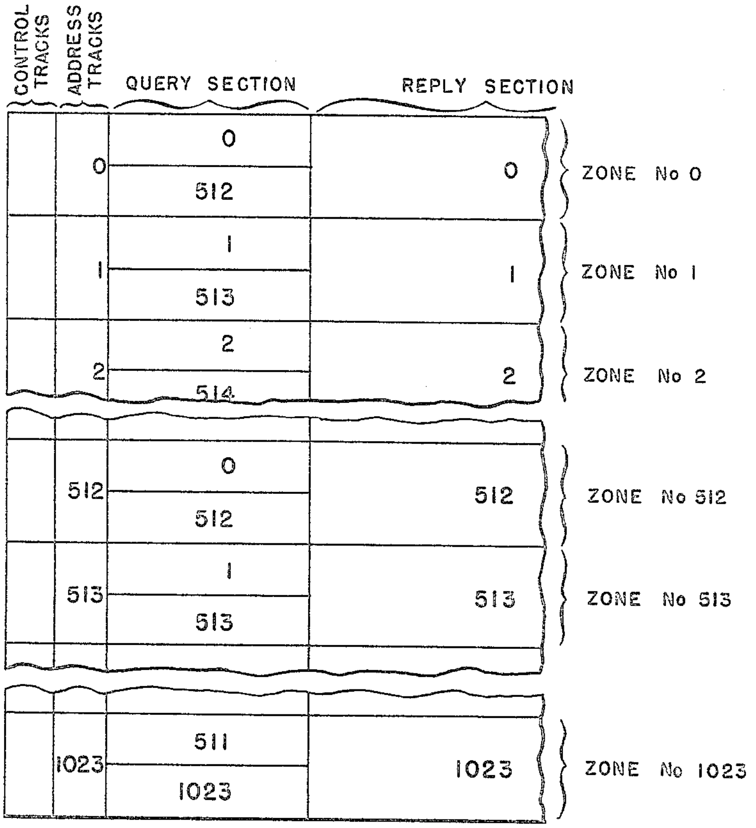
FIGURE 2 shows a portion of the magnetic drum surface and illustrates the arrangement of the data stored on the drum.

Referring now to FIGURE 2, the drum 14 is divided into 1024 longitudinally-extending zones, one zone for each of the subscriber telephones 10. These zones consist of six slots, i.e. each zone contains space for six bits circumferentially along any track. On the two address tracks 30 are stored prerecorded bits (logical zeros and ones) identifying each corresponding zone. These address bits are fed to an address register 32 (FIGURE 1) which serves as the principal control for the switching circuit 16. The timing pulses on tracks 33 are fed to a timing circuit which is operable, by conventional means, to develop suitable timing gates to be used for the usual data processing control purposes throughout the system.

Because the lines 12 are sampled twice each revolution of the drum 14, each six-slot zone in the query section of the drum is further divided into two three-slot segments. For example, Zone No. 0 contains query segments for subscribers No. 0 and No. 512, etc. It should be noted that each subscriber thus has two identical segments, e.g. both Zones No. 0 and No. 512 contain query segments for subscribers No. 0 and No. 512.

Essentially simultaneously with the passage of one of the query segments for any given subscriber beneath the query writing heads 22, the line 12 corresponding to that subscriber will be switched to the input line 18 in order to sample the subscriber's line. At the same time, the other query segment for that subscriber will pass beneath the query reading heads 40 in order to determine the previous history of that subscriber's line. Signals developed by these reading heads are fed to the Query Logic 24 together with the sampled present state of the subscriber's line, and the Query Logic thereupon updates the subscriber's query segment then passing beneath the write heads. If the subscriber's line is unchanged from the previous sample, the query segment then passing beneath the write heads is made identical to the other query segment of that subscriber passing beneath the read heads.

(As a practical matter, of course, the reading heads 40 are positioned to sense the previous history of the subscriber's line just prior to the activation of the writing heads 22, in order to provide time for performing the necessary logic operations.)

Figure 3:
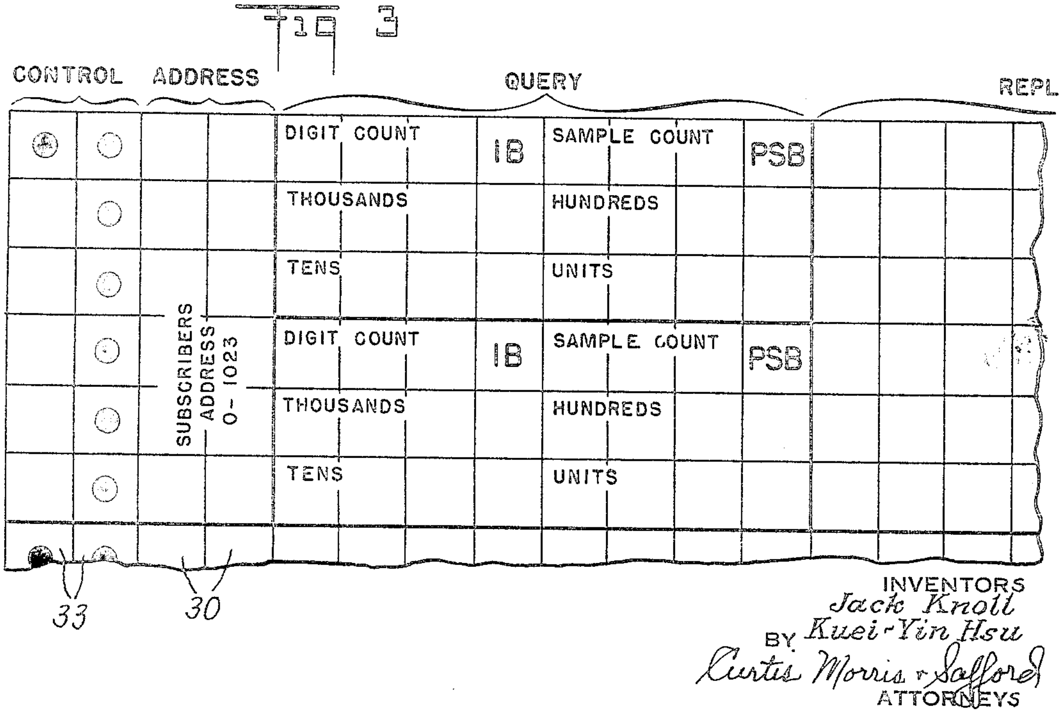
FIGURE 3 shows further details of the layout of the data stored on the drum.

Referring now to FIGURE 3, each query segment comprises twenty-four magnetic spots, or "bits," of the usual type used to represent, in binary form, items of information. The upper slot contains, at the right-hand end, a Previous State Bit (PSB) which indicates, by either a logical zero or logical one, whether that subscriber's line was open or closed on the previous sample. The next three adjacent bits represent the number of previous samples (Previous Sample Count, or PSC) in which that subscriber's line was unchanged. This count stops at 7, which serves to identify the end of a dialed digit.

At the left-hand end of the upper slot, the first three bits represent the number of digits dialed, and furnish signals to the Query Logic 24 for controlling the accumulation of the received dial pulses into distinct digits in corresponding positions in the query segment. This digit count (DC) advances at the end of each interdigit pause when the first dial pulse of a train opens the line.

The three bits of the digit count start out at 000. On receipt of the first dial pulse, the count advances to the first position 001 which it holds while the train of pulses representing the first data digit are accumulated in the first data digit area or bin, identified as "thousands," in the second slot of the query segment. At the first pulse of the second digit, the DC advances to the second position 011, and the train of pulses received thereafter are accumulated in the second data digit area or bin identified as "hundreds" in the second slot of the segment. Subsequently, the DC advances to the third position 101, and to the fourth position 111, in order to control the accumulation of the third and fourth digits in the lower slot in corresponding bins identified as "tens" and "units."

When the fourth data digit has been fully assembled, and the sample count has reached seven, the query (i.e. the dialed four-digit stock number) is transferred to a temporary storage 42 in a Query Register 44, providing of course the temporary storage does not already contain a previously transferred query. If the subscriber inadvertently dials a fifth digit before transfer to the Query Register can take place, the DC advances to a fifth position 110 which, when furnished as a control signal to Query Logic 24, prevents overwriting of the fourth data digit. Upon transfer of the assembled query to the Query Register, the DC is advanced to a sixth position 100, serving as a control signal to indicate that transfer has been completed and to prevent repetition of the transfer. Any dialing by the subscriber after transfer of the dialed data to the Query Register changes neither the DC nor the recorded digit data.

The upper slot of the query segment also contains a bit referred to as the inhibit bit (IB), and which, when it is "turned on" (logical one), prevents transmission of a reply to the subscriber. This bit is made a logical one whenever the subscriber hangs up, i.e. whenever (1) the sampled line is open, (2) the PSB shows open, and (3) PSC is at seven. The IB is turned off (logical zero) when a reply has been assembled in the reply section of the drum 14, following receipt of a dialed query.

When a subscriber hangs up, his line will be constantly sampled as open, so that the PSB will be zero, PSC will be seven, and the inhibit bit will be logical one. In this event, the digit counter (DC) and the digit storage bins are automatically cleared back to zero, in condition for a further query.

When the stock number dialed by a subscriber is transferred to the Query Register storage 42, that subscriber's address also is transferred to a second storage 46 in the Query Register 44. This address is to be used subsequently to direct the reply data to the proper subscriber.

As soon as the Query Register 44 is completely filled with the query data and the subscriber's address, conventional means (not shown herein) become operative to automatically generate and transmit a BID signal to control circuitry referred to herein as Reply Logic 48. This circuitry includes a register 50 having six sections 50*a*–50*f*, the first four of which are adapted respectively to receive the four dialed digits stored in the Query Register 44. If this register 50 is empty at the time the BID signal is received, the dialed digits are transferred to the four sections 50*a*–50*d*, and the other two sections are set to zero. Simultaneously, the subscriber's address is transferred to an address register 52.

Upon all the necessary query data having been transferred to registers 50 and 52, circuitry is automatically activated to retrieve from a central data processor 54, including a rotating magnetic storage drum 56, the required data concerning the particular stock identified by the subscriber. Drum 56 may, for example, contain 200 tracks, with each track having recorded thereon data concerning 10 different stocks. The block of data for each stock may be 100 decimal digits in length (i.e. 400 binary digits), so that each tracks of the drum contains 1000 decimal digits. The data for each stock is stored in a fixed format, and is updated when required by a data input device 58, e.g. of the type having a manually-operated keyboard 60.

The preferred system disclosed herein is so arranged that the digits stored in register 50 represent the starting address for the data to be retrieved from the drum 56. This system provides data on 2000 stocks, and the dial numbers assigned to these stocks are (for reasons not pertinent to this invention) in the range of 2000–3999. Thus, if the number dialed is 2758, the register 50 will contain the digits 275800, thereby identifying a stock located on track 75 (the first digit 2 being considered as a zero because it is the lowest first digit assigned to any stock). The data on this particular stock starts with digit number 800 around the periphery of track 75, and extends to digit number 900. If the dialed number had been 3756, the desired stock data would be found on track 175, starting with digit number 600.

Accordingly, the starting address data in register 50 is directed to the address logic 62 associated with processor 54. Also fed to this circuitry are the usual timing pulses from a synchronizing track 64 of the drum 56. These timing pulses operate a conventional counter to identify the digit number under the drum reading heads at any instant. When the output of this counter corresponds to the digit number in sections 50*d*–50*f* of register 50, the data digit then passing under the read heads is transferred to the first stage of a shift register reply buffer 66 in the Reply Logic 48. As soon as this transfer takes place, the digit stored in section 50*f* is increased by one (by a conventional "add-one" circuit), so that the address logic 62 will cause the next digit on the drum 56 to be transferred as soon as the synch pulse counter advances upon receipt of the next timing pulse. This procedure continues until the number stored in the register sections 50*d*–50*f* has been increased by 100; at that point, all the data concerning the particular stock requested will have been transferred to the reply buffer 66.

As mentioned above, in the particular system disclosed herein the stock data is stored on drum 56 in the form of four-bit digits, simply as a convenience in utilizing certain types of available processing equipment. However, the audio reply generating equipment utilized in this system required a six-bit character for each "word" to be transmitted back to the subscriber's telephone. For that reason, the data stored in the reply buffer 66 actually was first converted into corresponding six-bit code (by conventional means not shown), although of course if the data drum and output sections use the same code no translation will be required. In the specific system built in accordance with this invention, the longest reply consists of 66 output characters, which are formed after translation from 89 decimal digits stored in the 100-digit portion of the drum track. Unused digits in the 100 digit data field contain a code which translates into a "pause." When a reply is shorter than 66 characters, the unneeded last sections of the reply buffer will contain the pause code.

As soon as the reply buffer 66 is full, the reply data must be written on the reply section of thed rum 14, in the reply space assigned to the particular subscriber making the inquiry. This reply section contains 66 tracks, one for each word of a maximum length reply message, with each word being represented by a six-bit character disposed serially along the track in the corresponding subscriber's zone. As will be explained below, the audio reply equipment reads out the reply data one track at a time, developing an audible reply word for each six-bit character stored in the tracks, and distributing the words to the proper subscribers. With such an arrangement, the first character of the stock data in reply buffer 66 is placed on the track of drum 14 which will next be scanned by the output equipment, thereby assuring that each subscriber will hear first the initial word of his reply message. The transfer of the reply characters to the drum 14 can be performed by various means known in the art, and the particular means employed forms no part of the present invention. It may be noted in passing, however, that the subscriber's address stored in register 52 is used to control, through the use of conventional address gating means such as indicated by the block 53, the placement of the reply characters in the zone of the subscriber requesting the data, this result being accomplished by appropriately activating the read-write heads 70 only when that particular zone is passing therebeneath.

The read-write heads 70 for the reply section of the drum 14 also are connected to the terminals of a stepping switch arrangement 72 the common lead 74 of which is connected to the control circuitry for the audio output equipment, and referred to herein as the Output Logic 76. (Actually, in the commercial equipment the switch 72 would consist of electronic circuitry, but is referred to herein as a "stepping" switch simply to emphasize the nature of the function performed.) Stepping switch 72 serves to furnish to Output Logic 76 the six-bit reply characters stored in the reply tracks of drum 14, one track at a time. Simultaneously with the development of these reply character signals, the subscriber addresses corresponding to each character are furnished to Output Logic 76 over line 77. These two sets of signals are stored in suitable registers, e.g. arrays of magnetic cores, forming part of the Output Logic circuitry, and serving as a multiplexing relay switch system to control the simultaneous distribution to the subscribers of spoken words which have been pre-recorded on a continuously rotating audio drum 78.

The audio drum 78 rotates once every 440 milliseconds, of which 400 ms. is assigned to read-out of the prerecorded words (all starting at the same time), and the remaining 40 ms. is dead or pause time. During the dead time, an end-of-word (EOW) signal is developed to cause transfer of the next set of six-bit code signals from the reply section of drum 14 to the Output Logic 76. This is accomplished by reading out one complete track of the reply section of the drum, and sending these code signals together with the associated subscribers' addresses to the temporary registers of the Output Logic. This transfer is completed during the 40 ms. dead time, and during the subsequent 400 ms. the audio read-out heads 80 are switched to selected subscriber's output lines 82 in accordance with the six bit code signals stored in the Output Logic. Thus all subscriber lines requiring reply messages will simultaneously receive one word of the reply. The switching circuitry in the Output Logic is completely flexible in that any one of the read-out heads 80 can be connected to any one, or more, of the output lines 82, in accordance with the particular message requirements.

The writing of the six-bit reply signals on the reply section of the drum 14 is independent of the stepping switch 72, and writing of the reply can take place rapidly during the 400 ms. period of word read-out from the audio drum. High speed writing can be accomplished by using a separate read-write chain for each track of the reply section, and by transferring the reply data parallel-by-character from the buffer 66 onto the drum. In order to assure that the first word of the message is placed in the track next to be scanned by the stepping switch 72, the characters in buffer 66 can, by conventional means, be recirculated and shifted to proper locations in accordance with the particular track then being scanned by the stepping switch.

We claim:

1. In a query and reply system of the type comprising a central station and a plurality of remote stations connected thereto by respective transmission channels, said remote stations including means to develop and transmit to said central station query messages in the form of a series of pulses; time-shared input multiplexing means at said central station for sequentially sampling all of the channels from said remote stations at a high rate of speed sufficient to sample all of the pulses developed by said remote stations; first cyclically-operable memory means at said central station adapted to have data bits recorded therein, said first memory means comprising a plurality of query storage sections each assigned to a corresponding one of said remote stations; first circuit means arranged to scan said query storage sections in repetitive cycles and in synchronism with said input multiplexing means, said first circuit means including means operable with said input multiplexing means for directing to the query storage sections query message signals from the assigned remote stations respectively; data processing means coupled to said first memory means to develop sets of output signals in response to each complete query message assembled in said first memory means; second cyclically-operable memory means at said central station and having a plurality of reply storage sections assigned to said remote stations respectively; second circuit means operable with said data processing means to direct each set of said output signals therefrom to the reply storage section assigned to the remote station which originated the corresponding query message; means for sequentially scanning said reply storage sections to read-out the signals stored therein; output multiplexing means coupled to said reply section scanning means and responsive to the output signals stored therein, said output multiplexing means including means to produce and distribute to said remote stations answer message corresponding to each set of output signals; each answer message being directed by said output multiplexing means to the remote station to which the respective reply storage section is assigned, said output multiplexing means being adapted to produce answer message for all of said remote stations effectively simultaneously;

the improvement in said system wherein said query storage sections are arranged to store control data bits developed in response to signals from said remote stations and to be used for effecting control over the transmission of signals from said output multiplexer to the respective remote station; and means for operating said first and second memory means in time synchronism such that the scanning of said query and reply storage sections occurs together, whereby control data bits stored in any query storage section may be associated directly with the data scanned from the corresponding reply section to permit modification of the operation of said output multiplexer in developing signals responsive to the scanning of said corresponding reply section.

2. Apparatus as claimed in claim 1, including addressing means operable in synchronism with said first circuit means to produce address signals corresponding to each of said query storage sections, and register means for supplying to said data processing means an address signal corresponding to each complete query message transferred to said data processing means, and means responsive to the address stored in said register means for directing the set of output signals from said data processing means to the reply storage section corresponding to the query storage section from which the query message was derived.

3. Apparatus as claimed in claim 2, wherein said first memory means comprises a rotating magnetic drum, said addressing means including a set of address signals recorded sequentially on said drum and sensed in synchronism with the drum rotation.

4. Apparatus as claimed in claim 1, wherein said first and second memory means comprise rotating magnetic record means rotated together in synchronism past respective transducing heads.

5. Apparatus as claimed in claim 4, wherein said first and second magnetic record means form at least part of a single magnetic drum.

6. Apparatus as claimed in claim 5, wherein said first circuit means includes means to record the query message signals in predetermined slots of said drum corresponding to the remote station from which the query message was received.

7. Apparatus as claimed in claim 6, wherein said transmission channels comprise individual circuits leading to each of said remote stations, and switch means synchronized with the rotation of said drum for sampling said individual circuits in rapid succession to determine the presence and absence of signal pulses thereon.

8. Apparatus as claimed in claim 1, wherein each of said query storage sections includes means to receive an inhibit bit adapted when activated to prevent transmission of a reply from said output multiplexing means to the corresponding remote station, whereby a subscriber at any remote station may be prevented from hearing a reply previously assembled in the corresponding reply storage section in response to a previous query from that remote station.

9. Apparatus as claimed in claim 1, wherein said first memory means comprises a rotatable memory device with transducing head means associated therewith, said device having a set of two separate storage subsections for each of said remote stations, the individual sub-sections of each set being spaced apart along the periphery of said device, said input multiplexing means being arranged to sample said transmission channel at least twice for each rotation of said rotatable memory device and in synchronism with the scanning of the corresponding query subsections, and feedback control circuit means for comparing the current data sampled from said transmission channel with the data stored on the sub-section scanned in the preceding sequence; said feedback control circuit means being operable to update the other of said sub-sections, then being scanned, in response to the results of such comparison.

10. Apparatus as claimed in claim 9, wherein said memory device is a magnetic drum having transducing head means at two positions spaced approximately 180° about the periphery thereof, the output of said feedback control circuit means being directed to one of said transducing head means to continually update the data recorded on said drum, the other transducing head means serving to read the data previously recorded on said drum and to direct corresponding signals to said feedback control circuit means for comparison with the signals developed by said input multiplexing means.

References Cited

UNITED STATES PATENTS

| | | | |
|---|---|---|---|
| 3,181,124 | 4/1965 | Hammel | 340—172.5 |
| 3,202,972 | 8/1965 | Stafford et al. | 340—172.5 |
| 3,253,263 | 5/1966 | Lee. | |

PAUL J. HENON, *Primary Examiner.*

I. S. KAVRUKOV, *Assistant Examiner.*